(12) United States Patent
Ohazama et al.

(10) Patent No.: US 7,614,018 B1
(45) Date of Patent: Nov. 3, 2009

(54) WEB BASED USER INTERFACE FOR SELECTING OPTIONS

(75) Inventors: Chikai J. Ohazama, Mountain View, CA (US); Darren Delaye, San Francisco, CA (US)

(73) Assignee: Google Inc., Mountain View, CA (US)

( * ) Notice: Subject to any disclaimer, the term of this patent is extended or adjusted under 35 U.S.C. 154(b) by 803 days.

(21) Appl. No.: 11/353,316

(22) Filed: Feb. 13, 2006

(51) Int. Cl.
*G06F 3/00* (2006.01)
(52) U.S. Cl. ........................................ 715/862; 715/815
(58) Field of Classification Search .............. 715/862, 715/763, 764, 977, 860
See application file for complete search history.

(56) References Cited

U.S. PATENT DOCUMENTS

| | | | | |
|---|---|---|---|---|
| 5,736,974 A | * | 4/1998 | Selker | 715/862 |
| 5,973,694 A | * | 10/1999 | Steele et al. | 715/835 |
| 7,434,177 B1 | * | 10/2008 | Ording et al. | 715/862 |
| 2002/0160817 A1 | * | 10/2002 | Salmimaa et al. | 455/566 |

* cited by examiner

*Primary Examiner*—Weilun Lo
*Assistant Examiner*—Phenuel S Salomon
(74) *Attorney, Agent, or Firm*—Sterne, Kessler, Goldstein & Fox PLLC

(57) ABSTRACT

Icons can be combined to form toolbars such as those appearing on computer desktops and within application windows such as web browsers. Small icons are desired because desktop real estate is expensive. Small icons can be difficult to select or open because it can be hard to confirm which icon is indicated. An icon is indicated when the desktop cursor hovers over it. Altering the indicated icon provides good user feedback. Icons inside browser windows can be changed varying their size. Non-indicated icons can revert to a minimum size while an indicated one grows to a maximum size. Different images can be displayed for different sized icons, producing a more pleasing appearance. Alternatively, icons can be presented as display images produced by morphing two images together using morphing functions and icon weights. Morphing includes growing and shrinking as well as color changes, animating, and so forth.

20 Claims, 7 Drawing Sheets

WEB BASED USER INTERFACE FOR SELECTING OPTIONS

TECHNICAL FIELD

Embodiments relate to the fields of desktop computing environments, windowing systems, graphical user interfaces, and web browsers.

BACKGROUND

Desktop computing environments are generally centered around a display device and a windowing system. The display device, such as a liquid crystal display, presents information. The windowing system arranges the information. A typical arrangement is an assortment of desktop icons and windows. A user can select a desktop icon with a pointing device. For example, under Microsoft Windows XP, double clicking the left mouse button while the mouse pointer is over an icon opens that icon. Opening a desktop icon causes a user application to launch. The user application opens at least one window on the desktop and the user interacts with the user application via the window.

The user uses a pointing device, usually a computer mouse, to select items on the desktop and within applications. Moving the mouse causes a desktop cursor to move. The desktop cursor indicates an icon, such as a desktop icon, when it is over the icon. An indicated desktop icon can be selected with a mouse click or opened with a double mouse click. The Windows XP windowing system darkens a selected desktop icon but does nothing to indicate that the desktop cursor is over the icon. Apple OS X has a Dock feature consisting of a row of icons. Indicating an icon causes the icon to grow from its current size to a maximum size. An icon that is no longer indicated shrinks from its current size to a minimum size. Those practiced in the art of desktop computing are familiar with windowing systems, computer desktops, and icons. Those practiced in the art of desktop computing under Apple OS X are familiar with Apple Dock, and icons that grow and shrink.

After the introduction of the Apple Dock, jsdock, short for javascript dock, technology was developed. The Apple Dock is used exclusively on the Apple OS X desktop and takes advantage of low level Apple OS X capabilities. The jsdock technology also produces a growing/shrinking effect on icons. The jsdock technology however, is used with web browsers and is not tied to any one operating system. A Windows XP user using the Firefox web browser can enjoy the jsdock graphical effects.

Apple Dock, which is part of the desktop, is used to launch user applications under Apple OS X. The jsdock technology, however, is run within a web browser and can not cause user applications to launch. Each jsdock icon can be associated with a software module that executes within the web browser when the jsdock icon is opened. A single mouse click, multiple mouse click, or other user input can be used to open a jsdock icon.

The jsdock technology, while being significantly different from the Apple Dock, suffers from a number of shortcomings. One shortcoming is that jsdock uses inefficient algorithms for discovering that an icon is indicated or not indicated and for scaling icons. Another shortcoming is that jsdock displays each icon by scaling a single image to the appropriate size. Yet another shortcoming is that jsdock is limited to image scaling effects.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore an aspect of certain embodiments to download a web page into a web browser window with the web page containing icons. Each icon has an icon size and an image selection. Each icon is also associated with a small image, a large image, an opening event, and a software module. As discussed above, an icon's opening event can occur when the user single clicks or double clicks on the icon. The software module associated with an icon is launched, or run within the browser, when the icon's opening event occurs. An icon can be initialized by setting its image selection to the associated small image and its size to the associated small image's size.

It is also an aspect of certain embodiments to display the icons within the web browser window. An icon can be displayed by displaying the selected image and scaling the selected image to have the same size as the icon size. Those skilled in the arts of digital images or graphical user interfaces know of many algorithms for scaling images.

It is yet another aspect of certain embodiments that, after the icons are first displayed, to enter an iterative loop. The iterative loop repeatedly executes a series of steps that consist, in essence, of waiting, updating, and redisplaying. There are different ways to wait. One way is to simply wait for a certain amount of time, such as 50 milliseconds. Another way is to use the windowing system to generate a wake up event, such as a mouse over event.

Different icons can be updated in different ways. An icon is the indicated icon if the desktop cursor is over the icon. As discussed above, the user controls the desktop cursor with a pointing device such as a computer mouse. The other icons can be collateral icons. If the indicated icon's icon size is larger than the associated large image's size then the indicated icon's size is set to equal the large image's size. If the indicated icon's icon size is less than the associated large image's size then the indicated icon's size is increased. An image's size can be increased by increasing its height, its width, or both. As with any numeric value, height and width can be increased by adding a constant value or by multiplication with a number exceeding one. If a collateral icon's size is less than the associated small image's size then the indicated icon's size is set to equal the small image's size. If the indicated icon's icon size is greater than the associated small image's size then the indicated icon's size is decreased. An image's size can be decreased by decreasing its height, its width, or both. As with any numeric value, height and width can be decreased by subtracting a constant value or by multiplication with a number less than one.

When one or more icons are updated the web browser window should also be updated. The web browser window can be updated by redisplaying all the icons or only those icons that have been updated. As discussed above, an icon can be displayed by scaling the selected image to the icon size and then presenting it in the web browser window.

BRIEF DESCRIPTION OF THE DRAWINGS

The accompanying figures, in which like reference numerals refer to identical or functionally similar elements throughout the separate views and which are incorporated in and form a part of the specification, further illustrate the embodiments and, together with the background, brief summary, and detailed description, serve to explain the principles of the embodiments.

DETAILED DESCRIPTION

The particular values and configurations discussed in these non-limiting examples can be varied and are cited merely to illustrate embodiments and are not intended to limit the scope of the invention.

Overview

Icons can be combined to form toolbars such as those appearing on computer desktops and within application windows such as web browsers. Small icons are desired because desktop real estate is expensive. Small icons can be difficult to select or open because it can be hard to confirm which icon is indicated. An icon is indicated when the desktop cursor hovers over it. Altering the indicated icon provides good user feedback. Icons inside browser windows can be changed varying their size. Non-indicated icons can revert to a minimum size while an indicated one grows to a maximum size. Different images can be displayed for different sized icons, producing a more pleasing appearance. Alternatively, icons can be presented as display images produced by morphing two images together using morphing functions and icon weights. Morphing includes growing and shrinking as well as color changes, animating, and so forth.

Architectural Overview

Figure 1:
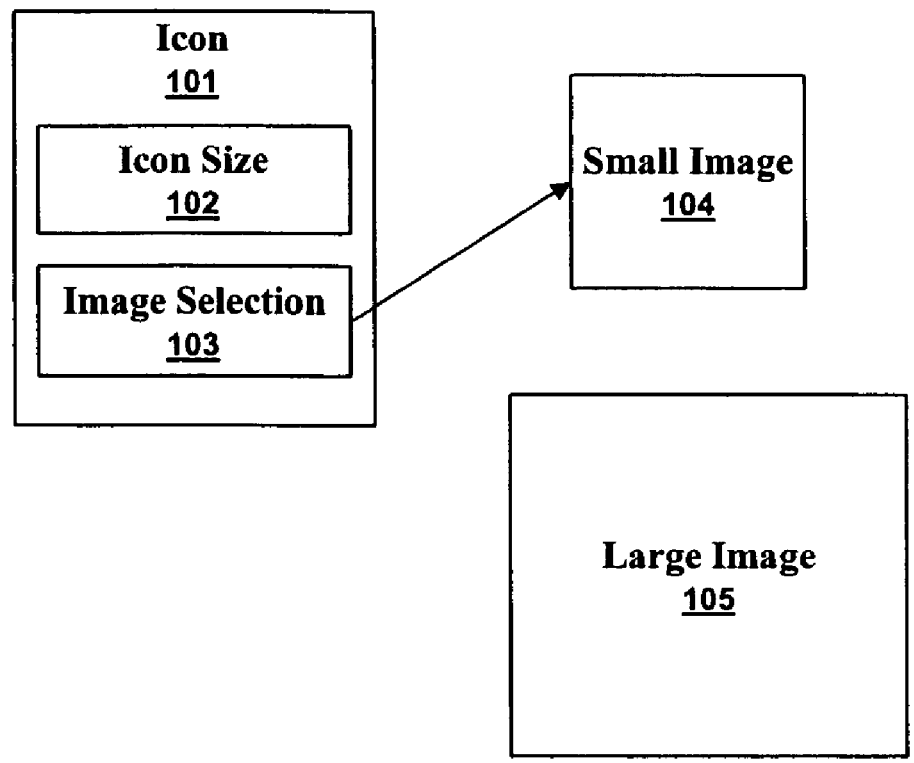
FIG. 1 illustrates an icon in accordance with aspects of certain embodiments.

FIG. 1 illustrates an icon 101 in accordance with aspects of certain embodiments. The icon has an icon size 102 and an image selection 103 for selecting a selected image. The image selection 103 is shown selecting a small image 104 associated with the icon 101. The image selection 103 can also select a large image 105 associated with the icon 101. The icon 101 can be displayed within a browser window as a scaled version of the selected image. Scaling means applying an algorithm to the selected image to produce an image having dimensions equaling a desired size.

Figure 2:
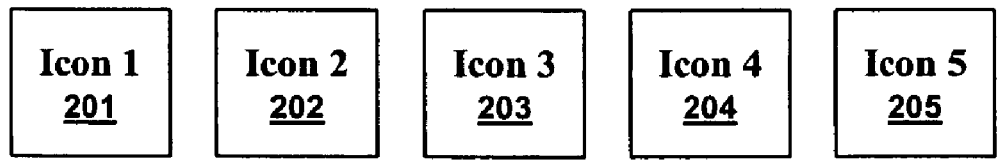
FIG. 2 illustrates a row of icons in accordance with aspects of the embodiments.

FIG. 2 illustrates a row of icons in accordance with aspects of the embodiments. As discussed above, a toolbar can be a simple display made of a row of icons. Icon 1 201, icon 2 202, icon 3 203, icon 4 204, and icon 5 205 are all shown as having the same icon size. All the icons have the same size because none of the icons is currently indicated or was recently indicated. The icon size of all the icons equals that of the small image corresponding to each of the icons, respectively.

Figure 3:
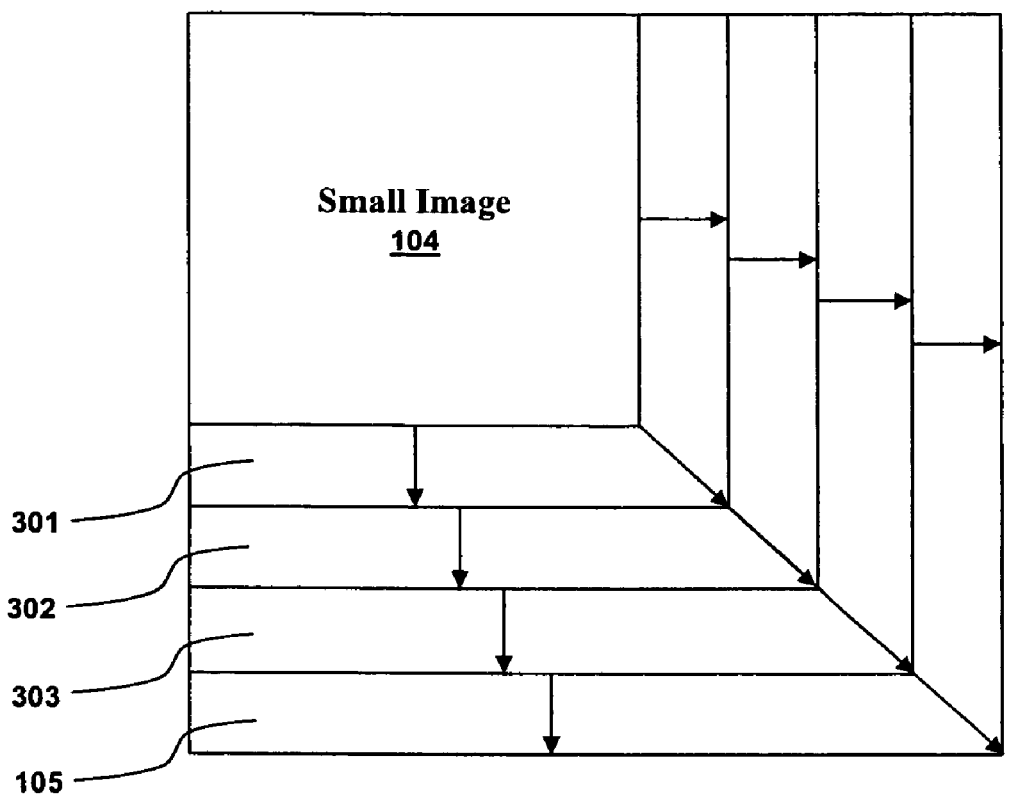
FIG. 3 illustrates scaling a small image in accordance with aspects of certain embodiments.

FIG. 3 illustrates scaling a small image 104 in accordance with aspects of certain embodiments. When an icon is indicated, it can be grown. Growing an icon means increasing the icon size by increasing its height, width, or both. The icon can be presented by displaying the selected image with dimensions equaling the icon size. If the small image 104 is selected, then it is scaled to a larger size. As such, an icon is initially presented by displaying the small image 104. When the icon is indicated it can grow and be presented as the first scaled image 301. If it remains indicated, it can be presented by a series of larger images such as the second scaled image 302 and the third scaled image 303. Eventually, the icon reaches its maximum size. The maximum size equals the dimensions of the associated large image 105. An icon having its maximum size is presented by displaying the associated large image 105. The scaled images can be scaled versions of either the associated large image 105 or the associated small image 104. In FIG. 3, only the associated small image 104 was scaled. In practice, more pleasing results can be obtained by scaling the large image 105. Alternatively, the small image 104 can be selected below a threshold and the large image 105 selected above it. For example, if the third scaled image 303 is larger than the threshold size, then it would be a scaled version of the large image 105.

Figure 4:
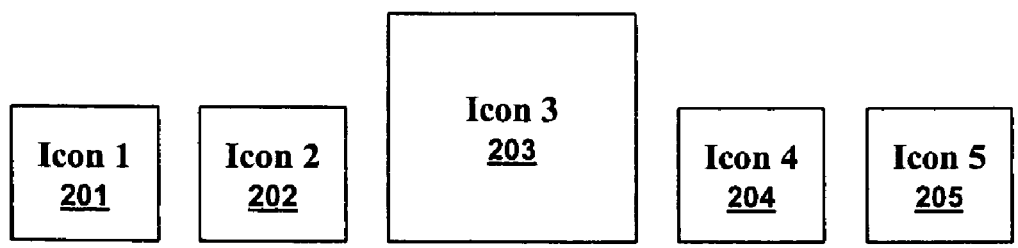
FIG. 4 illustrates a row of icons with the third one large in accordance with aspects of certain embodiments.

FIG. 4 illustrates a row of icons with the third one large in accordance with aspects of certain embodiments. FIG. 4 is similar in most respects to FIG. 2 with the exception that the third icon 203 is indicated. As such, the third icon 203 has grown.

Figure 5:
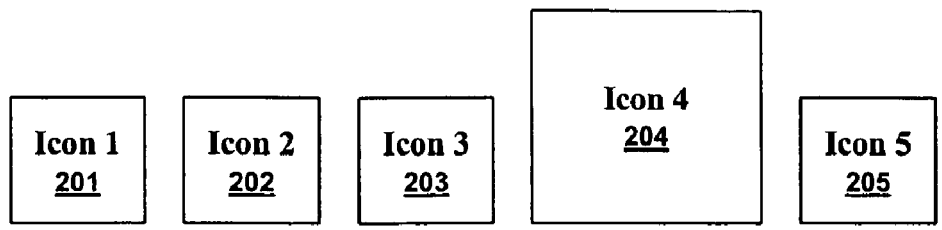
FIG. 5 illustrates a row of icons with the fourth one large in accordance with aspects of certain embodiments.

FIG. 5 illustrates a row of icons with the fourth one large in accordance with aspects of certain embodiments. FIG. 5 is also similar in most respects to FIG. 2 and FIG. 4. Here, however, the fourth icon 204 is indicated. As such, the fourth icon 204 has grown.

Scaling icons, as discussed above, is a special case of morphing. In scaling, large images or small images are morphed into display images by making them larger or smaller. Rotation is also a form of morphing. In FIG. 1, instead of image size 102, image rotation can be used.

Figure 6:
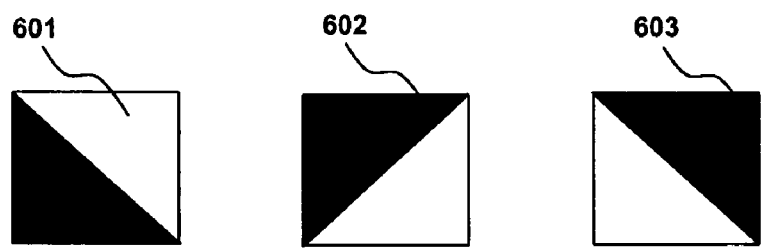
FIG. 6 illustrates morphing an icon by rotation in accordance with aspects of some embodiments.

FIG. 6 illustrates morphing an icon by rotation in accordance with aspects of certain embodiments. Instead of morphing dimensions between a small image and a large image, rotational transforms can be used. An icon can be presented by displaying a first image 601. When the icon is indicated, a rotational transform is applied. After rotating the first image 601 by 90 degrees, a rotated image 602 is displayed. After 180 degrees of rotation, the final image 603 can be displayed. In this example, two 90 degree steps are shown while in practice many smaller steps, perhaps 5 degrees or less, can be used.

Those skilled in the arts of digital imaging and image processing know of many algorithms for implementing rotational transformation.

In general, morphing can have a first image, a final image, and a weight. Various parameters or parts of the first image and the final image can be combined to produce a display image. For example, the final image can be a horizontally stretched version of the first image. The width of the display image can be calculated as a weighted sum:

$$w*b+(1-w)*a$$

where a is the width of the first image, b is the width of the second image and w is the weight. Here, the weight has a minimum value of zero and a maximum value of 1. Vertical scaling can be performed using the same equation with a being the height of the first image and b being the height of the second image. The display image can be produced by scaling a small image up or a large image down to the calculated dimensions. Changing the size of images in this manner is known by those skilled in the arts of image processing or image manipulation as geometric morphing.

Figure 7:
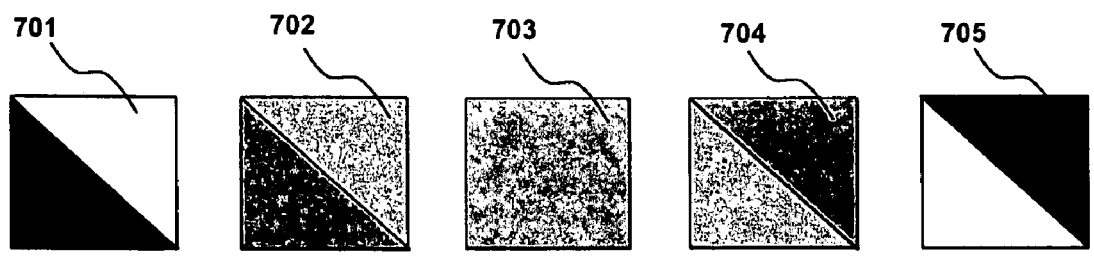
FIG. 7 illustrates morphing an icon by setting pixel values in accordance with aspects of some embodiments.

FIG. 7 illustrates morphing an icon by setting pixel values in accordance with aspects of certain embodiments. A first image 701 has black pixels to the lower left and white pixels to the upper right. A final image 705 has white pixels to the lower left and black pixels to the upper right. The second display image 702 has a weight of 0.25. Applying the weighted sum equation given above to pixel values, the second display image 702 has pixels that are 75% black and 25% white in the lower left corner and has pixels that are 25% black and 75% white in the upper right corner. The third display image 703 having a weight of 0.5 has all pixels 50% black and 50% white. The fourth display image 704 having a weight of 0.75 has pixels that are 25% black and 75% white in the lower left corner and has pixels that are 75% black and 25% white in the upper right corner. This example presented one variation of pixel morphing. Those skilled in the arts of image processing and animation are also familiar with color pixel morphing where pixel values are indexed into a color lookup table and changing pixel values can produce astonishing animation or pseudocolor effects.

Figure 10:
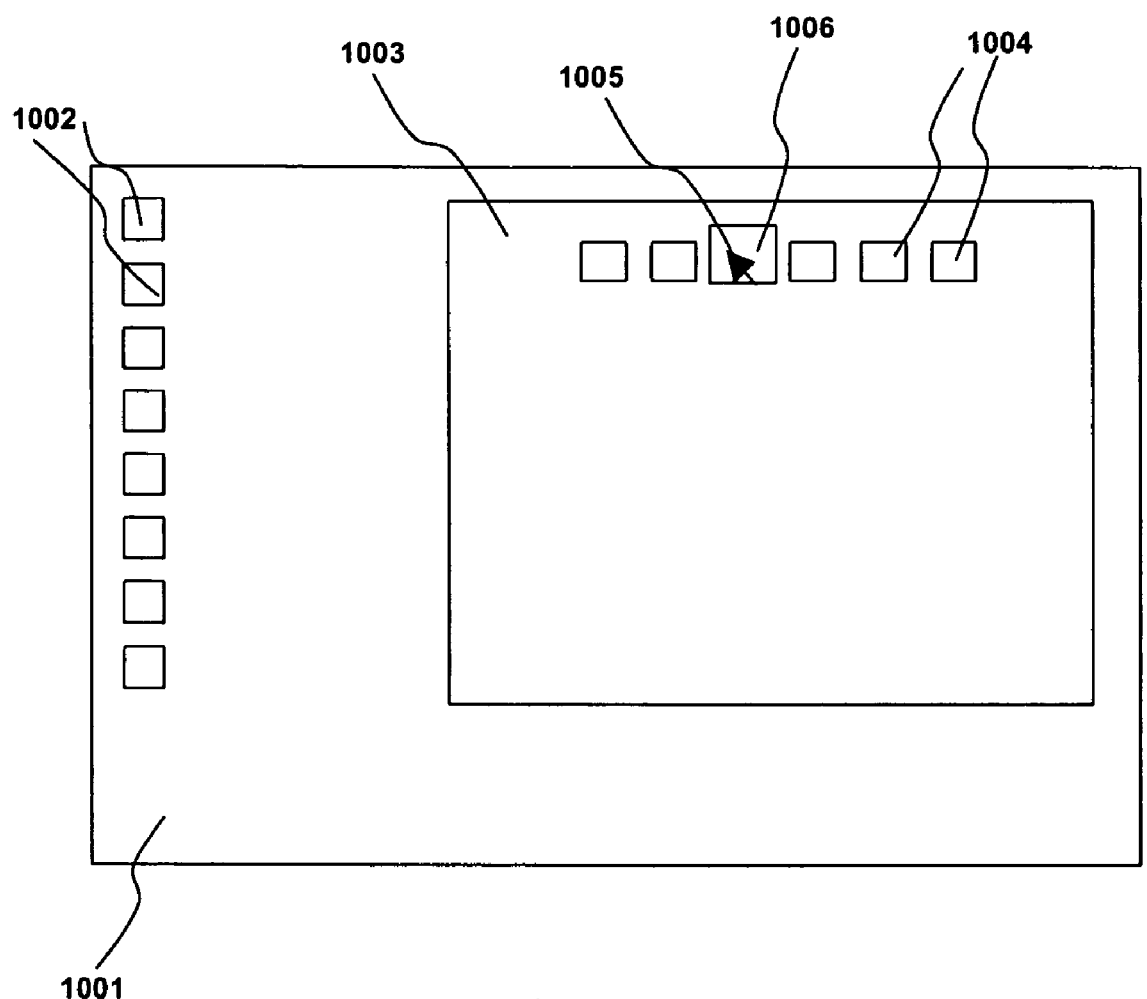
FIG. 10 illustrates a computer desktop in accordance with aspects of the embodiments.

FIG. 10 illustrates a computer desktop 1001 in accordance with aspects of the embodiments. Desktop icons 1002 are shown on the left side of the computer desktop 1001. A web browser window 1003 displays a downloaded web page that includes collateral icons 1004 and an indicated icon 1006. The indicated icon 1006 is indicated because the desktop cursor 1005 is over top of it.

High Level Process Flow

Figure 8:
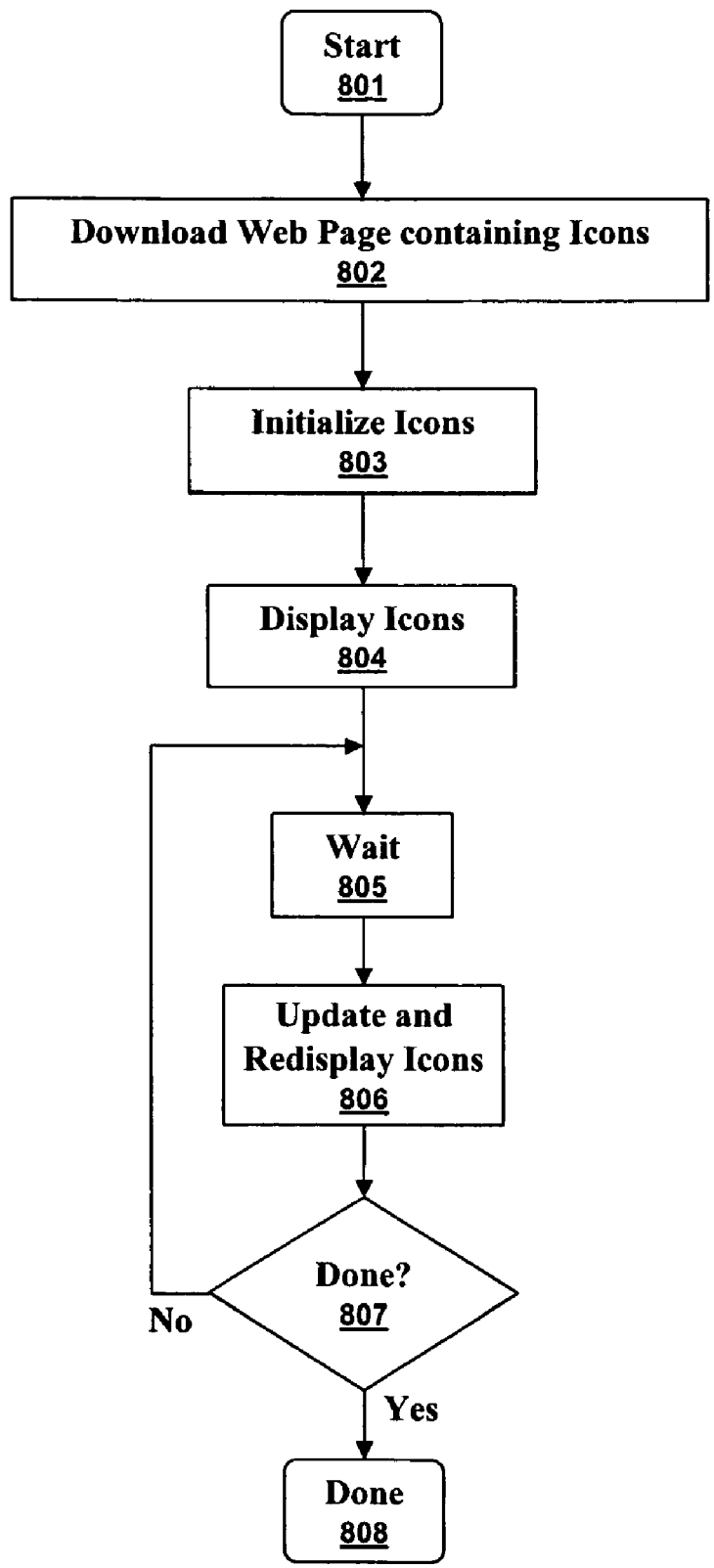
FIG. 8 illustrates a high level flow diagram of loading, displaying, updating, and redisplaying a web page in accordance with aspects of the embodiments.

FIG. 8 illustrates a high level flow diagram of loading, displaying, updating, and redisplaying a web page in accordance with aspects of the embodiments. After the start 801, a web page containing icons is downloaded 802. The icons are initialized 803 and then displayed 804 on the web page. The process then enters an iterative loop. The process waits 805 for a period of time or for a window system event, as discussed above. When it is done waiting, the process updates the icons and redisplays them 806. The process can update and redisplay each icon by submitting each icon to a process flow such as that illustrated in FIG. 9 or FIG. 11. If the process is not done 807, it loops back to waiting 805. Otherwise it is done 808.

Figure 9:
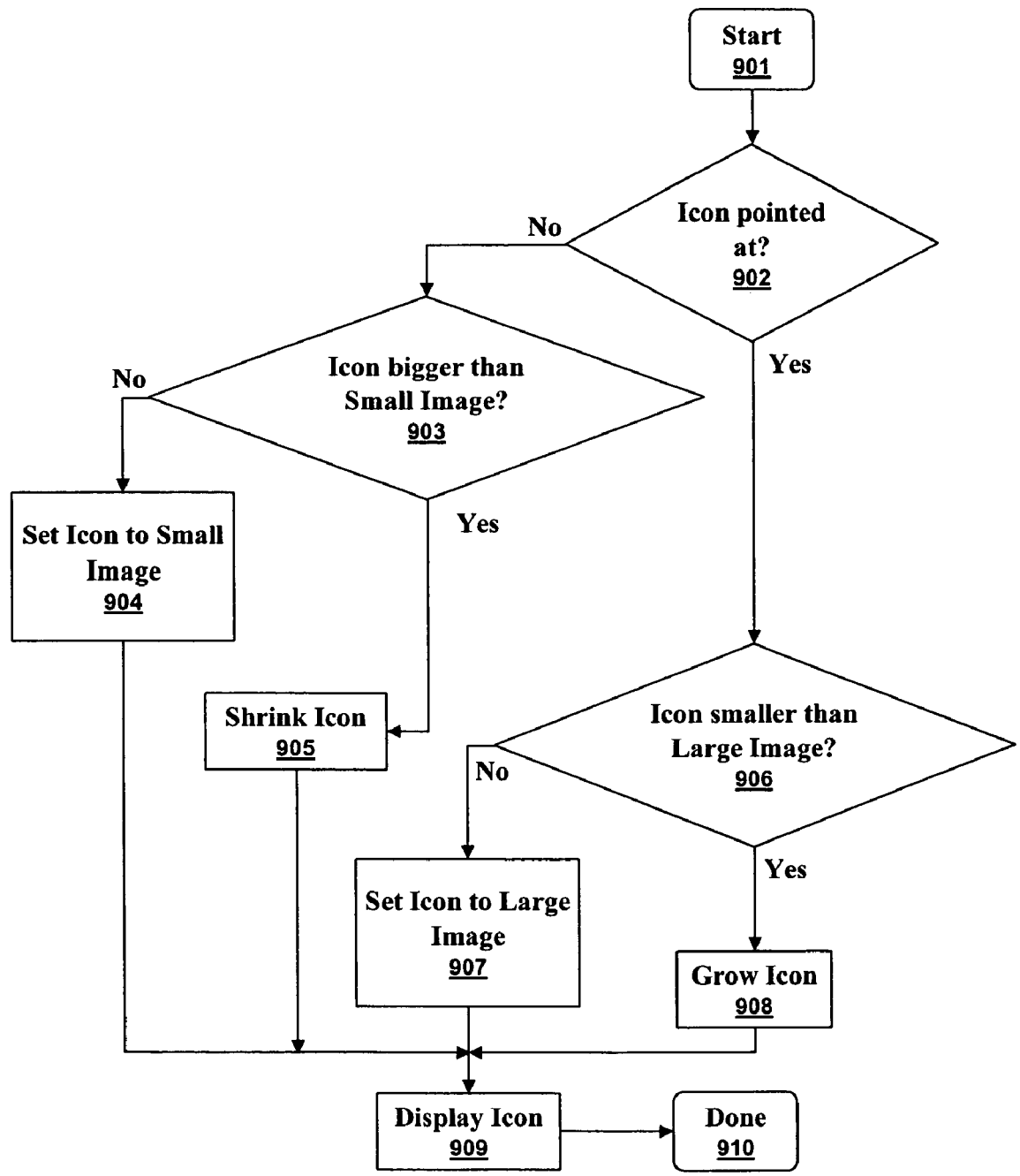
FIG. 9 illustrates a high level flow diagram of growing and shrinking an icon in accordance with aspects of certain embodiments.

FIG. 9 illustrates a high level flow diagram of growing and shrinking an icon in accordance with aspects of some embodiments. After the start 901, if an icon is pointed at 902 it is the indicated icon. Otherwise it is a collateral icon. Most of the time, no icon is indicated. If the icon is collateral and bigger than the small image 903 it is shrunk 905. Otherwise, it is set to the small image 904. If the icon is indicated and smaller than the large image 906, it is grown 908. Otherwise, it is set to the large image 907. Before the process is done 910, the icon is displayed 909.

As discussed above, growing an icon means increasing its icon size while shrinking it means decreasing the icon size. An icon can grow by adding a constant value to its icon size. An icon can shrink by subtracting a constant value from its icon size. Similarly, an icon can grow or shrink by multiplying its icon size by a number greater than or less than one respectively. The icon size has width and height. As such the constant value or the number can have a width value different from the height value so that the different dimensions of the icon exhibit different growth rates.

Figure 11:
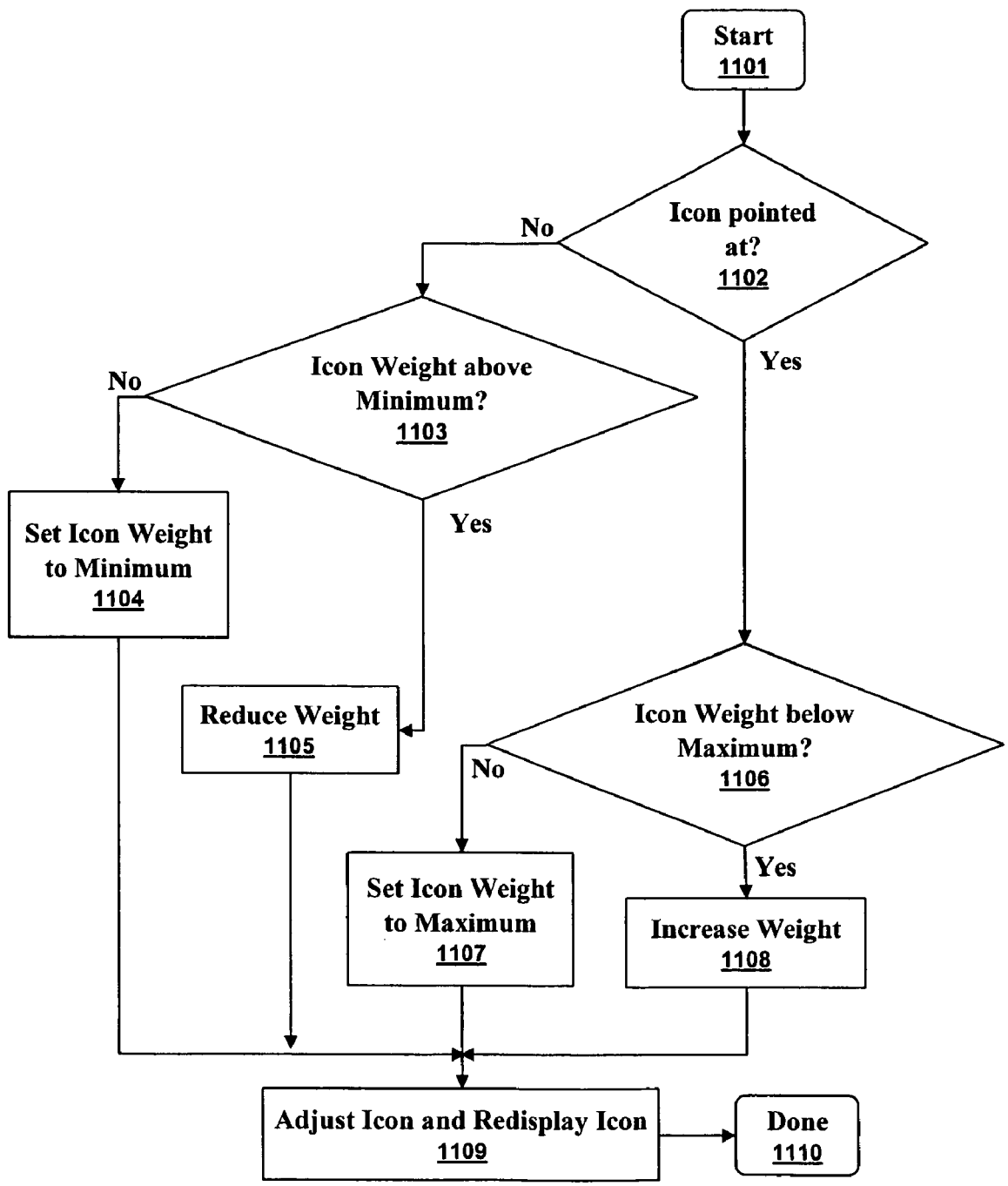
FIG. 11 illustrates a high level flow diagram of morphing an icon in accordance with aspects of some embodiments.

FIG. 11 illustrates a high level flow diagram of morphing an icon in accordance with aspects of the embodiments. The flow diagram of FIG. 11 is similar to that of FIG. 9 with the exception that FIG. 11 deals with an icon morphing based on a weight instead of scaling based on size. After the start 1101, if an icon is pointed at 1102 it is the indicated icon. Otherwise it is a collateral icon. Most of the time, no icon is indicated. If the icon is collateral and has a weight above the minimum 1103, the weight is reduced 1105. Otherwise, it is set to the minimum 1104. If the icon is indicated and weighs less than the maximum 1106 then its weight is increased 1108. Otherwise, its weight is set to the maximum 1107. Before the process is done 1110, the icon is adjusted and redisplayed 1109. Adjusting means that a new display image is produced using the morphing function, weight, first image and final image. Redisplay means that the image shown in the web browser is set to match the new display image.

Normalization is a mathematical operation that adjusts a set of variables so that they add up to a given total. Those skilled in the art of mathematics know of many normalization techniques. For example, ten variables can be normalized to 100. If at first, every variable is set to 5, then the sum is 50. Each variable is then multiplied by 2 because 100/50=2. If one of the variables is increased to 20, then every variable is multiplied by approximately 0.9 because 110/100 is approximately 0.9. Nine of the variables now equal 9 and one of them equals 18 for a sum of 99. The sum is not equal to 100 because of rounding error and results in a normalization error of 100−99=1. The normalization error can be added to one of the variables, distributed among the variables, or ignored.

Normalization produces a pleasing effect when growing or otherwise morphing icons. Normalizing the sizes of the icons causes the total size of the icons to remain constant. For example, an icon bar having ten icons will not grow or shrink as the ten icons grow or shrink if the icon sizes are normalized. As such, the icon bar does not seem to have a jerky behavior.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   downloading a web page into a web browser window wherein the web page comprises at least two icons wherein each of the at least two icons comprises an icon size and an image selection, wherein each of the at least two icons is associated with a software module, a small image, a large image, an opening event, and a morphing function, and wherein the opening event causes the software module to run and wherein the morphing function is a function that produces a display image from the small image and large image;
   initializing the at least two icons wherein the image selection is set to the associated small image and wherein the icon size is set to the size of the associated small image;
   displaying the at least two icons inside the web browser window wherein each icon is displayed by displaying the image selection with an area equaling the icon size; and
   entering an iterative loop comprising:
      waiting for a time interval and then determining if a pointing device is pointing at one of the at least two icons wherein the pointed at icon is called an indicated icon and every other icon is called a collateral icon;
      setting the image selection of the indicated icon to the indicated icon's associated large image and the indicated icon's icon size to the size of the associated large image if the indicated icon's icon size equals or exceeds the size of the associated large image;
      setting the image selection of every collateral icon to each respective collateral icon's associated small image and the respective collateral icon's icon size to the size of the associated small image if the size of the associated small image equals or exceeds the respective collateral icon's icon size;
      growing the indicated icon unless it exceeds the size of the indicated icon's associated large image;
      shrinking every collateral icon if it exceeds the size of the respective collateral icon's associated small image; and
      displaying the at least two icons on a display device.

2. The method of claim 1 wherein growing the indicated icon comprises:
   increasing the icon size by a constant amount in height and by a constant amount in length; and
   setting the icon's image selection to the icon's associated small image.

3. The method of claim 2 wherein shrinking every collateral icon comprises:
   decreasing the icon size by a constant amount in height and by a constant amount in length; and
   setting the icon's image selection to the icon's associated small image.

4. The method of claim 1 wherein growing the indicated icon comprises:
   increasing the icon size by a constant amount in height and by a constant amount in length; and
   setting the icon's image selection to the icon's associated large image.

5. The method of claim 4 wherein shrinking every collateral icon comprises:
   decreasing the icon size by a constant amount in height and by a constant amount in length; and
   setting the icon's image selection to the icon's associated large image.

6. The method of claim 1 wherein shrinking every collateral icon comprises:
   decreasing the icon size by a constant amount in height and by a constant amount in length; and
   setting the icon's image selection to the icon's associated small image.

7. The method of claim 1 wherein the iterative loop further comprises normalizing the icon size of the at least two icons.

8. A method comprising:
   downloading a web page into a web browser window wherein the web page comprises at least two icons wherein each of the at least two icons comprises a weight, wherein each of the at least two icons is associated with a software module, a first image, a final image, an opening event, and a morphing function, wherein the opening event causes the software module to run, wherein the morphing function is a function that produces a display image from the first image, the final image and the weight, and wherein the weight is a parameter used to produce the display image and the weight has an adjustable minimum value and an adjustable maximum value;
   initializing the at least two icons wherein the icons' weights are set to their minimum value and their morphing functions are used to produce their display images;
   displaying the at least two icons inside the web browser window wherein each icon is displayed by displaying the icon's display image; and
   entering an iterative loop comprising:
      waiting for a time interval and then determining if a pointing device is pointing at one of the at least two icons wherein the pointed at icon is called an indicated icon and every other icon is called a collateral icon;
      if the indicated icon's weight exceeds the maximum value then setting the indicated icon's weight to the maximum value and updating the indicated icon's display image;
      if the indicated icon's weight is less than the maximum value then increasing the indicated icon's weight and updating the display image;
      for every collateral icon having a weight less than the minimum value, setting the collateral icon's weight to the minimum value and updating the display image;

for every collateral icon having a weight exceeding the minimum value, reducing the collateral icon's weight and updating the display image; and updating the web browser window to display the most recent display image for each of the at least two icons.

9. The method of claim 8 wherein increasing the weight comprises adding a constant value to the weight.

10. The method of claim 8 wherein reducing the weight comprises subtracting a constant value from the weight.

11. The method of claim 8 wherein increasing the weight comprises multiplying the weight by a value greater than 1.

12. The method of claim 8 wherein decreasing the weight comprises multiplying the weight by a value less than 1.

13. The method of claim 8 wherein, for every icon, the morphing function calculates pixels of the display image as a weighted sum of first image pixel values and final image pixel values and wherein the icon's weight is used to calculate the weighted sum.

14. The method of claim 8 wherein, for every icon, the morphing function calculates height and width of the display image as a weighted sum of height and width of the first image and height and width of the final image and wherein the icon's weight is used to calculate the weighted sum.

15. The method of claim 14 wherein the morphing function produces a scaled first image and a scaled final image having the height and width of the display image and wherein the morphing function calculates pixel values of the display image as a weighted sum of scaled first image pixel values and scaled final image pixel values and wherein the icon's weight is used to calculate the weighted sum of the scaled first image pixel values and the scaled final image pixel values.

16. The method of claim 15 wherein increasing the weight comprises multiplying the weight by a value greater than 1.

17. The method of claim 16 wherein decreasing the weight comprises multiplying the weight by a value less than 1.

18. The method of claim 15 wherein increasing the weight comprises adding a constant value to the weight.

19. The method of claim 8 wherein the iterative loop further comprises normalizing the weight of the at least two icons.

20. A system comprising:

a means for choosing at least one small image and at least one large image;

a means for creating at least two icons wherein each one of the at least two icons is associated with one of the at least one small image, is associated with one of the at least one large image, and comprises an icon size, and an image selection, wherein the image selection is set to the associated small image, and wherein the icon size is set to the size of the associated small image, a means for morphing each of the at least two icons from the at least one small image and the at least one large image associated with each icon;

a display means for displaying in a window the at least two icons wherein the image selection is displayed with an area equaling the icon size;

a means for selecting one of the at least two icons wherein selecting the icon causes a software module to run;

a means for indicating one of the at least two icons such that the indicated icon is called an indicated icon and every other icon is called a collateral icon;

a means for repeatedly identifying the indicated icon;

a means for repeatedly increasing the indicated icon's icon size without exceeding the size of the icon's associated large image;

a means for repeatedly decreasing every collateral icon's icon size without reducing it below the size of the icon's associated small image; and a display means for repeatedly displaying the at least two icons in the window.

* * * * *